United States Patent
Lee

(10) Patent No.: US 8,228,654 B2
(45) Date of Patent: Jul. 24, 2012

(54) APPARATUS AND METHOD FOR PROTECTING BATTERY BY COMPARISON OF FULL CHARGE CAPACITY

(75) Inventor: Jonathan Lee, Chungbuk (KR)

(73) Assignee: LG Chem, Ltd., Seoul (KR)

( * ) Notice: Subject to any disclaimer, the term of this patent is extended or adjusted under 35 U.S.C. 154(b) by 312 days.

(21) Appl. No.: 12/664,603

(22) PCT Filed: Sep. 9, 2009

(86) PCT No.: PCT/KR2009/005097
§ 371 (c)(1),
(2), (4) Date: Dec. 14, 2009

(87) PCT Pub. No.: WO2010/055995
PCT Pub. Date: May 20, 2010

(65) Prior Publication Data
US 2011/0228434 A1    Sep. 22, 2011

(30) Foreign Application Priority Data
Nov. 14, 2008    (KR) .................. 10-2008-0113158

(51) Int. Cl.
*H02H 3/08* (2006.01)
(52) U.S. Cl. .................................... 361/93.7
(58) Field of Classification Search ............ 361/93.7
See application file for complete search history.

(56) References Cited

U.S. PATENT DOCUMENTS

| | | | |
|---|---|---|---|
| 4,426,612 A * | 1/1984 | Wicnienski et al. | 320/146 |
| 5,539,318 A * | 7/1996 | Sasaki | 324/428 |
| 6,008,627 A | 12/1999 | Narita | |
| 6,456,042 B1 * | 9/2002 | Kwok | 320/134 |
| 6,492,791 B1 | 12/2002 | Saeki et al. | |
| 2005/0046389 A1* | 3/2005 | Kim | 320/132 |
| 2009/0303647 A1* | 12/2009 | Bauer et al. | 361/87 |

FOREIGN PATENT DOCUMENTS

| | | |
|---|---|---|
| KR | 10-0276406 B1 | 12/2000 |
| KR | 10-2006-0019772 A | 3/2006 |
| KR | 10-0688135 A | 3/2007 |
| KR | 10-0879772 B1 | 1/2009 |

* cited by examiner

*Primary Examiner* — Ronald W Leja
(74) *Attorney, Agent, or Firm* — Birch, Stewart, Kolasch & Birch, LLP

(57) ABSTRACT

An apparatus protects a battery by comparison of full charge capacity. The apparatus includes a fuse connected on a circuit path along which a charging or discharging current flows, a fuse control switch for selectively opening or closing an operating current applied to the fuse, and a controller for calculating an actual value and a reference value of a full charge capacity of a battery, comparing the actual value with the reference value, and then controlling the fuse control switch according to the comparison result to melt and cut the fuse. Thus, an abnormal state of a battery may be found and controlled at an early stage, so it is possible to prevent any problem such as firing and thus improve the safety of a battery.

8 Claims, 2 Drawing Sheets

【Figure 1】
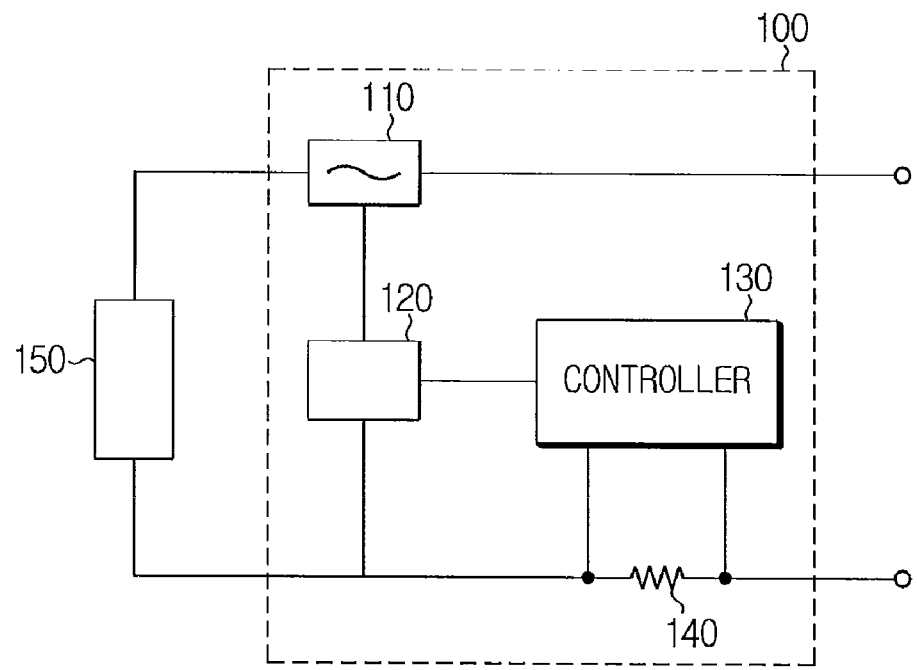
【Figure 2】
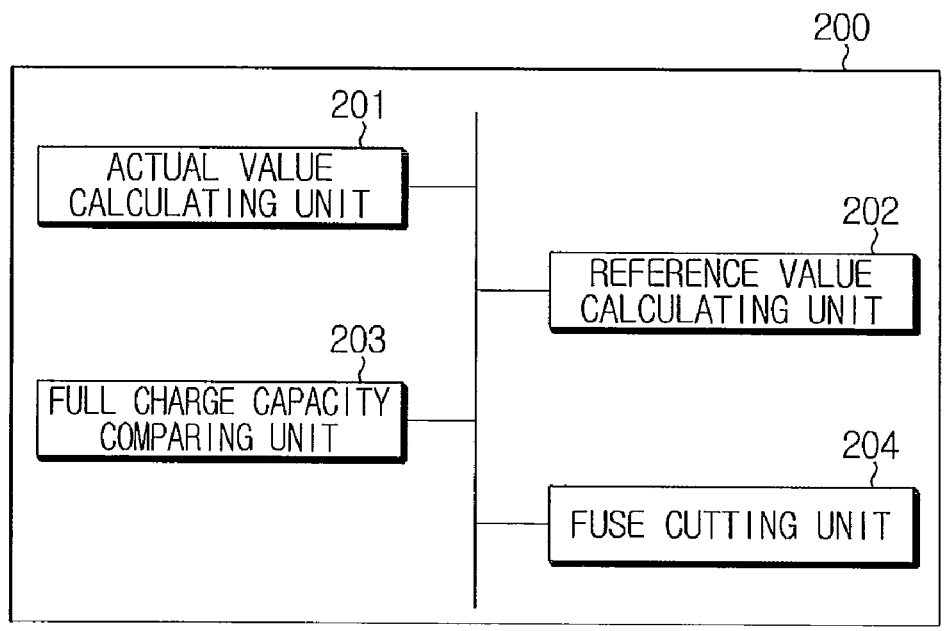

[Figure 3]
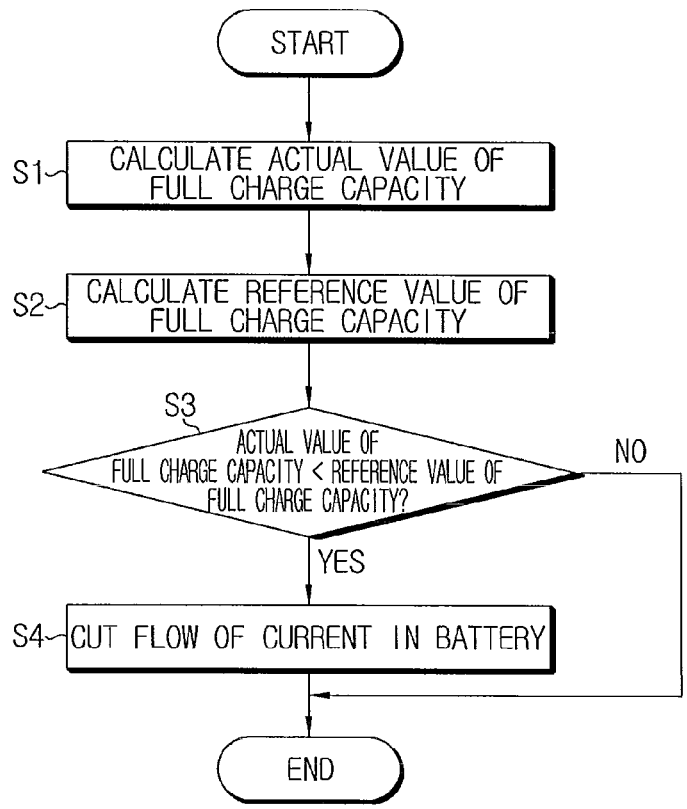
[Figure 4]
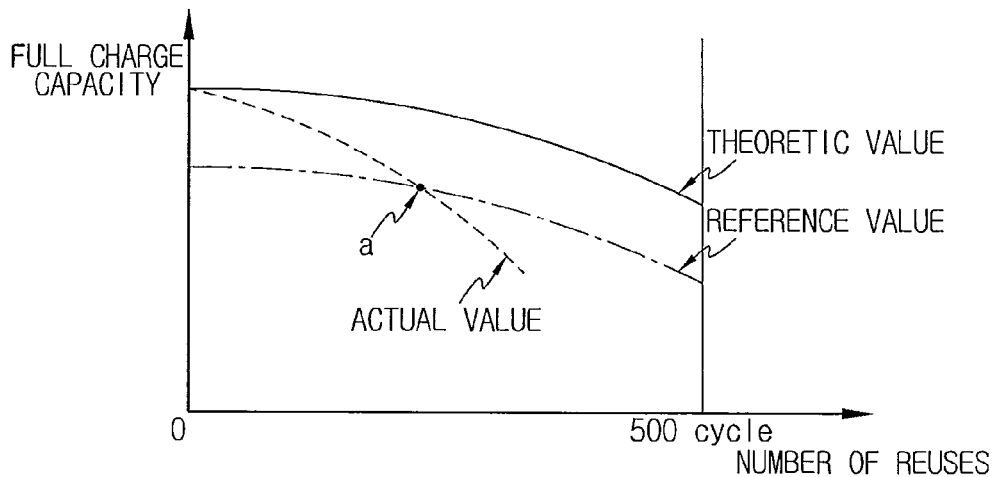

APPARATUS AND METHOD FOR PROTECTING BATTERY BY COMPARISON OF FULL CHARGE CAPACITY

TECHNICAL FIELD

The present invention relates to a battery, and more particularly to apparatus and method for protecting a battery by comparison of full charge capacity.

BACKGROUND ART

In recent, the demands on portable electronic products such as notebooks, video cameras and cellular phones are rapidly increased, and the development of electric vehicles, energy storage batteries, robots and satellites is under active progress. Accordingly, high-performance secondary batteries capable of being repeatedly charged are vigorously researched.

Currently, nickel-cadmium batteries, nickel-hydrogen batteries, nickel-zinc batteries and lithium secondary batteries are commercially available as secondary batteries. Among them, lithium secondary batteries are spotlighted since they may be freely charged or discharged since memory effects are scarcely caused in comparison to nickel-based secondary batteries. In addition, lithium secondary batteries exhibit very low self-discharge rate and high energy density.

A battery used for portable electronic products such as notebooks should display a remaining capacity since it has a limited use time. A remaining capacity of a battery is generally displayed as a percentage based on the full charge capacity (FCC). Thus, in order to display a remaining capacity of a battery, it is necessary to exactly check and update the full charge capacity of the battery. The full charge capacity of a battery is set to a certain value when the battery is produced in a factory, but the full charge capacity is gradually decreased as the battery is repeatedly charged and discharged. Thus, the full charge capacity of a battery should be constantly updated, and there are proposed various kinds of algorithms used for updating such a full charge capacity. The full charge capacity of a battery may be calculated as a capacity actually charged to a secondary battery from a fully discharged time to a fully charged time. On the contrary, the full charge capacity may also be calculated as a capacity actually discharged from a secondary battery from a fully charged time to a fully discharged time. Users generally charge a battery again before the battery is fully discharged, so the later method is recently more frequently used.

Recently, the most important social issue in relation to batteries is the safety. In particular, notebooks and cellular phones are used more and more, and if a battery is exploded, a portable electronic product having the battery may be broken, which may cause even a fire. Thus, it is urgent to ensure the safety of a battery. Until now, various kinds of protecting devices have been used to ensure the safety of a battery. Such a protecting device intercepts a charging/discharging current by melting and cutting a fuse if an abnormal state was detected in a battery. However, seeing that explosion accidents of batteries still occur unceasingly, it is considered that the safety of a battery does not reach a satisfactory level. In addition, though a conventional battery protecting device prevents a fire caused by battery-related accidents, the battery may get scorched due to heat, which also damages electronic products.

DISCLOSURE

Technical Problem

The present invention is designed to solve the problems of the prior art, and therefore it is an object of the present invention to provide apparatus and method for protecting a battery, which may improve the safety of a battery by finding an abnormal state of the battery in an early stage.

Technical Solution

In order to accomplish the above object, the present invention provides an apparatus for protecting a battery, which includes a fuse connected on a circuit path along which a charging or discharging current flows; a fuse control switch for selectively opening or closing an operating current applied to the fuse; and a controller for calculating an actual value and a reference value of a full charge capacity of a battery, comparing the actual value with the reference value, and then controlling the fuse control switch according to the comparison result to melt and cut the fuse.

In another aspect of the present invention, there is also provided a method for protecting a battery by comparison of full charge capacity of a battery, the method including: (S1) calculating an actual value of a full charge capacity of the battery; (S2) calculating a reference value of a full charge capacity of the battery; (S3) comparing the actual value of a full charge capacity of the battery, calculated in the step (S1), with the reference value of a full charge capacity of the battery, calculated in the step (S2); and (S4) intercepting a flow of current in the battery according to the comparison result of the step (S3).

Advantageous Effects

According to the present invention, an abnormal state of a battery may be found and controlled at an early stage, so it is possible to prevent any problem such as firing and thus improve the safety of a battery.

DESCRIPTION OF DRAWINGS

FIG. 1 is a block diagram showing an apparatus for protecting a battery according to one embodiment of the present invention;

FIG. 2 is a block diagram illustrating operations of a controller employed in the battery protecting apparatus according to one embodiment of the present invention;

FIG. 3 is a flowchart illustrating a method for protecting a battery by comparison between an actual value of a full charge capacity of a battery and a reference value according to one embodiment of the present invention; and FIG. 4 is a graph showing an actual value of the full charge capacity of a battery, a theoretic value and a reference value in comparison according to one embodiment of the present invention.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

FIG. 1 is a block diagram showing an apparatus 100 for protecting a battery according to one embodiment of the present invention.

The battery protecting apparatus 100 according to the present invention is connected to a battery cell 150, and includes a fuse 110, a sense resistor 140, a fuse control switch 120 and a controller 130. The fuse 110 is connected on a circuit path along which a charging or discharging current flows, and the fuse 110 irreversibly breaks a voltage path to protect a battery when an abnormal state such as overcharging, overdischarging, electric short circuit or overcurrent occurs. Also, the sense resistor 140 is connected to a circuit path along which a charging or discharging current flows, and the sense resistor 140 senses a current flowing in the battery protecting apparatus 100, and the fuse control switch 120 selectively opens or closes an operating current applied to the fuse.

The controller 130 calculates an actual value of a full charge capacity of a battery and a reference value, compares the actual value with the reference value, and controls the fuse control switch 120 according to the comparison result to melt and cut the fuse 110. Here, the actual value of the full charge capacity means a full charge capacity of a battery currently used, and the reference value of a full charge capacity means a criterion value to be compared with the actual value of the full charge capacity. Preferably, the controller 130 controls the fuse control switch 120 to melt and cut the fuse 110 when an actual value of the full charge capacity is smaller than a reference value as a result of comparison. If the fuse 110 is melted and cut, the flow of charging or discharging current is intercepted.

In addition, the controller 130 preferably has a memory, and the memory stores data necessary to execute operations of the controller 130. For example, the memory may store numerals or formulas necessary for the controller 130 to calculate an actual value and a reference value of the full charge capacity or programs necessary for the controller 130 to perform operations.

FIG. 2 is a block diagram showing operations of the controller employed in the battery protecting apparatus according to the present invention.

As shown in FIG. 2, an operating configuration 200 of the controller according to the present invention includes an actual value calculating unit 201 for calculating an actual value of a full charge capacity of a battery, a reference value calculating unit 202 for calculating a reference value of a full charge capacity of a battery, a full charge capacity comparing unit 203 for comparing the actual value of a full charge capacity with the reference value, and a fuse cutting unit 204 for melting and cutting the fuse when the comparison result satisfies a certain condition.

Hereinafter, the operating process of the controller according to the present invention will be explained with reference to a flowchart. FIG. 3 is a flowchart illustrating a method for protecting a battery by comparing an actual value of a full charge capacity of a battery with a reference value according to one embodiment of the present invention.

Referring to FIG. 3, the controller first calculates an actual value of a full charge capacity of a battery (step S1). The actual value of the full charge capacity is calculated when a certain condition is satisfied. For example, when charging/discharging cycles are accumulated to a certain number or when a certain use time of the battery has passed, the full charge capacity is calculated again. As the use time of the battery increases, the full charge capacity is gradually reduced, so the full charge capacity should be newly updated and the updated full charge capacity should be used for controlling a charging or discharging of the battery in order to prevent overcharging or overcharging of a battery. The controller stores and manages the accumulated number of charging/discharging cycles and the battery use time in a memory. In relation to the condition for initiating the operation of calculating an actual value of a full charge capacity of a battery, the actual value of a full charge capacity of a battery may be calculated by integrating a discharge current from the time that the battery is charged to a full charge voltage till the time that the battery is discharged to a full discharge voltage. In other case, the actual value of the full charge capacity may be calculated by integrating a charge current from the time that the battery is discharged to a full discharge voltage till the time that the battery is fully charged to a full charge voltage.

Meanwhile, various methods well known in the art may be used for calculating an actual value of a full charge voltage of a battery in addition to the above integrating methods. Thus, the present invention is not limited to any method adopted to calculate an actual value of a full charge voltage of a battery.

After calculating an actual value of a full charge capacity of a battery, the controller calculates a reference value of the full charge capacity of the battery (step S2). The method for calculating the reference value of the full charge capacity will be explained later. Here, it would be apparent to those having ordinary skill in the art that the step S1 and the step S2 may be executed in a reverse order.

Then, the controller compares the actual value of the full charge capacity of the battery with the reference value and then determines whether or not to intercept the flow of battery current (step S3). In the step S3, if the controller determines to intercept a current, the controller controls the fuse control switch to melt and cut the fuse, thereby irreversibly intercepts the flow of battery current (step S4).

Preferably, the controller determines to intercept the flow of current in case the actual value of the full charge capacity of the battery is smaller than the reference value of the full charge capacity of the battery by a predetermined level in the step S3.

On occasions, it would be also possible that the controller intercepts the flow of current when it is determined that the actual value of the full charge capacity of the battery is smaller than the reference at least twice successively.

Meanwhile, in the step S2, the controller preferably calculates the reference value by multiplying a theoretic value of the full charge capacity of the battery by a predetermined value not greater than 1. Here, the theoretic value of a full charge capacity means a full charge capacity obtainable at a present charging/discharging cycle in a normal state. More preferably, in the step S2, the controller calculates the reference value by multiplying the theoretic value of the full charge capacity by an efficiency (namely, a discharge efficiency or a charge efficiency) of a battery in a normal state and an abnormal operating count rate (AOCR). In this case, the reference value of a full charge capacity may be calculated according to the following equation 1.

Reference Value of Full Charge Capacity=Theoretic Value of Full Charge Capacity×Battery Efficiency×AOCR   Equation 1

Here, AOCR represents a maximum allowable range within which the full charge capacity of a battery may be determined as normal on the basis of a theoretic value of the full charge capacity of a battery. For example, assuming that AOCR is 80%, if an actual value of a full charge capacity of a battery has a value over 80% of the full charge capacity of a normal battery, the battery may be considered as having no abnormality. Meanwhile, AOCR may also be expressed as a term ACCR (Abnormal Charge Count Rate) at a charging process or ADCR (Abnormal Discharge Count Rate) at a discharging process.

Hereinafter, the method for calculating a reference value of a full charge capacity of a battery according to a preferred embodiment of the present invention is explained in more detail.

TABLE 1

|                                           | Number of Reuses |      |      |      |      |      |
|-------------------------------------------|------------------|------|------|------|------|------|
|                                           | 1                | 50   | 100  | 200  | 300  | 500  |
| Theoretic Value of Full Charge Capacity (mAh) | 2600         | 2500 | 2400 | 2200 | 2100 | 1900 |

The table 1 shows one example of a theoretic value of a full charge capacity of a battery according to one embodiment of the present invention. As shown in the table 1, as the number of reuses (or, the number of charging/discharging cycles) increases, in other words as the battery is repeatedly charged/discharged, the theoretic value of the full charge capacity is decreased. Meanwhile, if the battery includes several battery cells connected in parallel, the theoretic value of a full charge capacity is multiplied by the number of battery cells connected in parallel. For example, seeing the table 1, when the number of reuses is 50, the theoretic value of a full charge capacity is 2500 mAh. However, if two battery cells are connected in parallel, the theoretic value of a full charge capacity becomes 5000 mAh, and, if three battery cells are connected in parallel, the theoretic value becomes 7500 mAh.

TABLE 2

|             | C-rate |       |       |       |
|-------------|--------|-------|-------|-------|
| Temperature | 0.5 C  | 1.0 C | 1.5 C | 2.0 C |
| 10° C.      | 90%    | 89%   | 85%   | 80%   |
| 25° C.      | 100%   | 98%   | 95%   | 90%   |
| 45° C.      | 100%   | 100%  | 98%   | 95%   |
| 60° C.      | 100%   | 100%  | 98%   | 95%   |

The table 2 shows one example of battery efficiency according to one embodiment of the present invention. The efficiency suggested in the table 2 may be a battery discharging efficiency or a battery charging efficiency. As seen from the table 2, the efficiency of a battery may be determined in consideration of C-rate and temperature. Seeing the table 2, in case C-rate is 1.0 C and temperature is 25° C., the battery exhibits a charging/discharging efficiency of 98%.

Hereinafter, a reference value for a full charge capacity of a battery is calculated in detail according to one embodiment of the present invention with reference to the equation 1 and the tables 1 and 2. It is assumed that a battery having the theoretic value of a full charge capacity as shown in the table 1 has one battery cell, the number of reuses is 50, C-rate is 1.0 C, temperature is 25° C., and AOCR is 80%. Seeing the table 1, the full charge capacity of the battery has a theoretic value of 2500 mAh, and seeing the table 2, the efficiency of a battery becomes 98%. Thus, the reference value of a full charge capacity of a battery may be calculated as follows according to the equation 1.

Reference Value=2500×0.98×0.8×=1960 mAh

Meanwhile, it is apparent to those having ordinary skill in the art that the theoretic value of a full charge capacity, the efficiency of a battery and AOCR may be varied according to various conditions such as the kind of battery and use condition as mentioned above.

Also, though not shown in FIG. 3, if determining that the full charge capacity of a battery is in a normal range in the step S3, the controller updates an existing full charge capacity stored in the memory into a newly calculated full charge capacity.

FIG. 4 is a graph comparatively showing an actual value, a theoretic value and a reference value of a full charge capacity of a battery according to one embodiment of the present invention.

Referring to FIG. 4, the reference value of a full charge capacity is corresponding to a value obtained by subtracting a predetermined ratio from a theoretic value of a full charge capacity. In other words, the reference value of a full charge capacity is obtained by multiplying the theoretic value of a full charge capacity of a battery by a certain value not greater than 1. In this embodiment, a battery is determined as in a normal state when an actual value of a full charge capacity is greater than a reference value. However, if the actual value of a full charge capacity is lower than the reference value as shown in a right region of FIG. 4 based on the point a, it is determined that the battery is in an abnormal state, and the fuse is melted and cut to intercept the current flowing in the battery.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. An apparatus for protecting a battery, comprising:
   a fuse connected on a circuit path along which a charging or discharging current flows;
   a fuse control switch for selectively opening or closing an operating current applied to the fuse; and
   a controller for calculating an actual value and a reference value of a full charge capacity of a battery, comparing the actual value with the reference value, determining whether the battery is in an abnormal state according to the comparison result, and then controlling the fuse control switch to melt and cut the fuse when the battery is determined as being in an abnormal state.

2. The apparatus for protecting a battery according to claim 1,
   wherein when the actual value of a full charge capacity is smaller than the reference value of a full charge capacity, the controller determines that the battery is in an abnormal state and controls the fuse control switch to melt and cut the fuse.

3. The apparatus for protecting a battery according to claim 1,
wherein the controller calculates the reference value by multiplying a theoretic value of a full charge capacity by a predetermined value not greater than 1.

4. The apparatus for protecting a battery according to claim 3,
wherein the predetermined value is obtained by multiplying an efficiency of the battery and AOCR (Abnormal Operating Count Rate).

5. A method for protecting a battery by comparison of full charge capacity of a battery, the method comprising:
(S1) calculating an actual value of a full charge capacity of the battery;
(S2) calculating a reference value of a full charge capacity of the battery;
(S3) comparing the actual value of a full charge capacity of the battery, calculated in the step (S1), with the reference value of a full charge capacity of the battery, calculated in the step (S2); and
(S4) determining whether the battery is in an abnormal state according to the comparison result of the step (S3), and intercepting a flow of current in the battery when the battery is determined as being in an abnormal state.

6. The method for protecting a battery according to claim 5,
wherein, in the step (S4), when the actual value of the step (S1) is smaller than the reference value of the step (S2) according to the comparison result of the step (S3), it is determined that the battery is in an abnormal state and the flow of current is intercepted.

7. The method for protecting a battery according to claim 5,
wherein, in the step (S2), the reference value is calculated by multiplying a theoretic value of a full charge capacity by a predetermined value not greater than 1.

8. The method for protecting a battery according to claim 7,
wherein the predetermined value is obtained by multiplying an efficiency of the battery and AOCR.

* * * * *